(12) United States Patent
Weiler et al.

(10) Patent No.: US 8,209,474 B1
(45) Date of Patent: Jun. 26, 2012

(54) SYSTEM AND METHOD FOR SUPERBLOCK DATA WRITES

(75) Inventors: Patrick J. Weiler, Northborough, MA (US); Robert W. Beauchamp, Littleton, MA (US)

(73) Assignee: EMC Corporation, Hopkinton, MA (US)

( * ) Notice: Subject to any disclaimer, the term of this patent is extended or adjusted under 35 U.S.C. 154(b) by 279 days.

(21) Appl. No.: 12/571,324

(22) Filed: Sep. 30, 2009

(51) Int. Cl.
*G06F 12/00* (2006.01)
(52) U.S. Cl. ......... 711/103; 365/185.33; 711/E12.001; 711/12.008
(58) Field of Classification Search .......... 365/185.33; 711/103, E12.001, E12.008
See application file for complete search history.

(56) References Cited

U.S. PATENT DOCUMENTS

| | | | | |
|---|---|---|---|---|
| 6,262,918 | B1* | 7/2001 | Estakhri et al. | 365/185.33 |
| 2010/0172180 | A1* | 7/2010 | Paley et al. | 365/185.12 |
| 2010/0174845 | A1* | 7/2010 | Gorobets et al. | 711/103 |
| 2010/0241914 | A1* | 9/2010 | Chen et al. | 714/718 |

* cited by examiner

*Primary Examiner* — Kevin Ellis
*Assistant Examiner* — Mehdi Namazi
(74) *Attorney, Agent, or Firm* — Holland & Knight LLP; Brian J. Colandreo, Esq.; Mark H. Whittenberger, Esq.

(57) ABSTRACT

A method, computer program product, and computing system for obtaining N data segments for storage within N data planes included within a flash-memory storage device. Each of the N data planes includes a plurality of data blocks. A superblock is defined, wherein the superblock includes a data block from each of the N data planes included within the flash-memory storage device. Data is; and simultaneously writing data to each data block included within the superblock.

18 Claims, 3 Drawing Sheets

SYSTEM AND METHOD FOR SUPERBLOCK DATA WRITES

TECHNICAL FIELD

This disclosure relates to data writing procedures and, more particularly, to data writing procedures that write data to multiple data blocks simultaneously.

BACKGROUND

Many uses of flash memory devices emphasize the read capability of flash memory devices over the write capability of flash memory devices due to endurance limitations of the floating gate technology. However, some applications require a method to dump data to non-volatile storage devices as quickly as possible (e.g., during a power failure). However, given the rare nature of power fail events, use of flash memory devices is a suitable non-volatile medium. Unfortunately, current flash-based drives are limited in their write performance because they do not take full advantage of the concurrent programming (i.e., writing) capabilities of the flash memory devices.

Currently, flash wear-leveling (WL) algorithms manage the wear-leveling at the block level since that is the erase granularity of the flash memory devices. Typically, device blocks that fail to erase are marked bad and are never used again (through the use of a Bad Block Management (BBM) algorithm. Further, blocks that have been erased too often are avoided for use until other blocks have near the same erase count. Over time, the normal use of a flash memory device uses up all programmable media so a "garbage collection" (GC) process is needed to free-up under utilized blocks having pages that have been invalidated by the need to over-write old data. Unfortunately, the sequential writing of blocks gets fragmented due to bad blocks, WL and GC methods.

SUMMARY OF DISCLOSURE

In one implementation of this disclosure, a computer-implemented method includes obtaining N data segments for storage within N data planes included within a flash-memory storage device. Each of the N data planes includes a plurality of data blocks. A superblock is defined, wherein the superblock includes a data block from each of the N data planes included within the flash-memory storage device. Data is simultaneously written to each data block included within the superblock.

One or more of the following features may be included. Simultaneously writing data to each data block included within the superblock may include simultaneously writing at least a portion of each of the N data segments to each corresponding data block included within the superblock, resulting in each data block included within the superblock being at least partially populated with data obtained from the corresponding data segment. Simultaneously writing data to each data block included within the superblock may include simultaneously writing a data page of each of the N data segments to each corresponding data block included within the superblock.

Simultaneously writing a data page of each of the N data segments to each corresponding data block included within the superblock may include simultaneously writing: a data page of a first data segment to a first data block included within the superblock; a data page of a second data segment to a second data block included within the superblock; a data page of a third data segment to a third data block included within the superblock; and a data page of a fourth data segment to a fourth data block included within the superblock.

A register included within the flash-memory storage device may be associated with each of the N data planes, thus defining N associated registers. Obtaining N data segments for storage within N data planes included within a flash-memory storage device may include temporarily storing each of the N data segments within an associated register chosen from the N associated registers. N may be equal to four and the plurality of data blocks may include five-hundred-twelve data blocks.

In another implementation of this disclosure, a computer program product resides on a computer readable medium and has a plurality of instructions stored on it. When executed by a processor, the instructions cause the processor to perform operations including obtaining N data segments for storage within N data planes included within a flash-memory storage device. Each of the N data planes includes a plurality of data blocks. A superblock is defined, wherein the superblock includes a data block from each of the N data planes included within the flash-memory storage device. Data is simultaneously written to each data block included within the superblock.

One or more of the following features may be included. Simultaneously writing data to each data block included within the superblock may include simultaneously writing at least a portion of each of the N data segments to each corresponding data block included within the superblock, resulting in each data block included within the superblock being at least partially populated with data obtained from the corresponding data segment. Simultaneously writing data to each data block included within the superblock may include simultaneously writing a data page of each of the N data segments to each corresponding data block included within the superblock.

Simultaneously writing a data page of each of the N data segments to each corresponding data block included within the superblock may include simultaneously writing: a data page of a first data segment to a first data block included within the superblock; a data page of a second data segment to a second data block included within the superblock; a data page of a third data segment to a third data block included within the superblock; and a data page of a fourth data segment to a fourth data block included within the superblock.

A register included within the flash-memory storage device may be associated with each of the N data planes, thus defining N associated registers. Obtaining N data segments for storage within N data planes included within a flash-memory storage device may include temporarily storing each of the N data segments within an associated register chosen from the N associated registers. N may be equal to four and the plurality of data blocks may include five-hundred-twelve data blocks.

In another implementation, a computing system includes at least one processor and at least one memory architecture coupled with the at least one processor. A first software module is executed on the at least one processor and the at least one memory architecture. The first software module is configured to obtain N data segments for storage within N data planes included within a flash-memory storage device, wherein each of the N data planes includes a plurality of data blocks. A second software module is executed on the at least one processor and the at least one memory architecture. The second software module is configured to define a superblock, wherein the superblock includes a data block from each of the N data planes included within the flash-memory storage device. A third software module is executed on the at least one processor and the at least one memory architecture. The third software module is configured to simultaneously write data to each data block included within the superblock.

One or more of the following features may be included. Simultaneously writing data to each data block included within the superblock may include simultaneously writing at least a portion of each of the N data segments to each corresponding data block included within the superblock, resulting in each data block included within the superblock being at least partially populated with data obtained from the corresponding data segment. Simultaneously writing data to each data block included within the superblock may include simultaneously writing a data page of each of the N data segments to each corresponding data block included within the superblock.

Simultaneously writing a data page of each of the N data segments to each corresponding data block included within the superblock may include simultaneously writing: a data page of a first data segment to a first data block included within the superblock; a data page of a second data segment to a second data block included within the superblock; a data page of a third data segment to a third data block included within the superblock; and a data page of a fourth data segment to a fourth data block included within the superblock.

A register included within the flash-memory storage device may be associated with each of the N data planes, thus defining N associated registers. Obtaining N data segments for storage within N data planes included within a flash-memory storage device may include temporarily storing each of the N data segments within an associated register chosen from the N associated registers. N may be equal to four and the plurality of data blocks may include five-hundred-twelve data blocks.

The details of one or more implementations are set forth in the accompanying drawings and the description below. Other features and advantages will become apparent from the description, the drawings, and the claims.

DETAILED DESCRIPTION OF THE PREFERRED EMBODIMENTS

Figure 1:
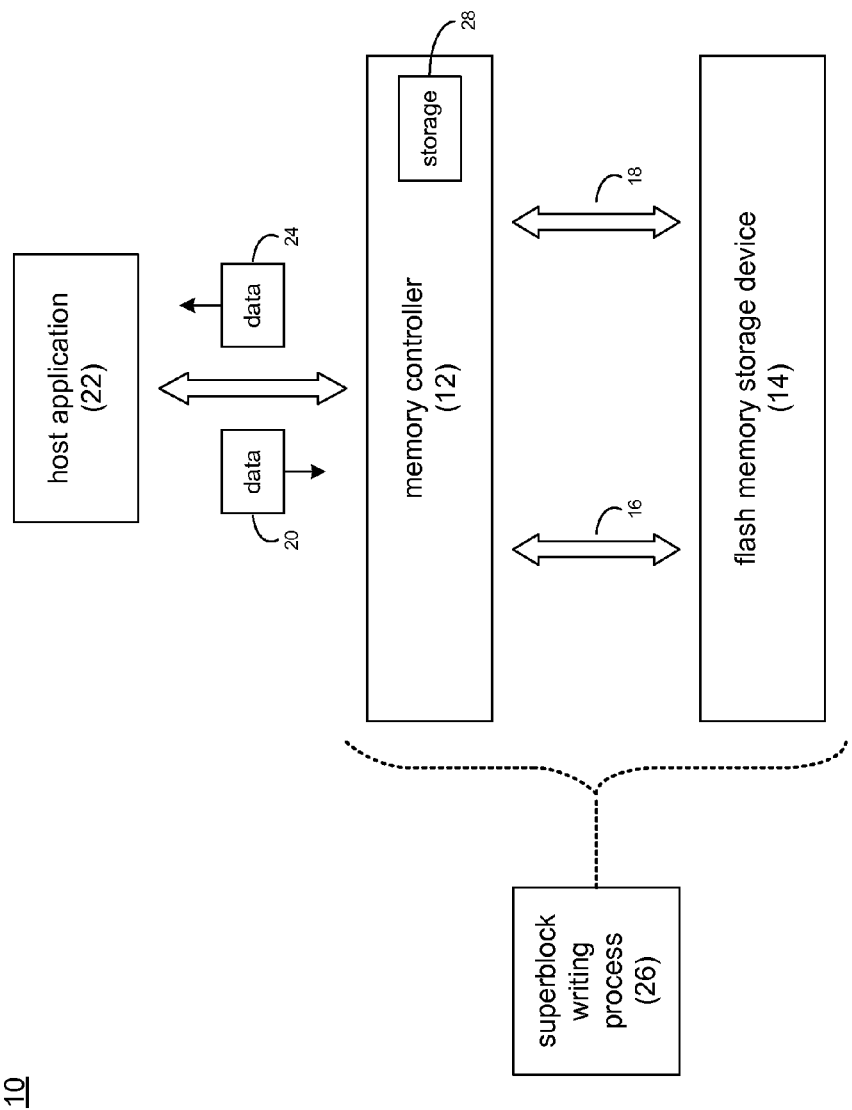
FIG. 1 is a diagrammatic view of a superblock writing process executed in whole or in part by a memory controller and a flash memory storage device.
Figure 2:
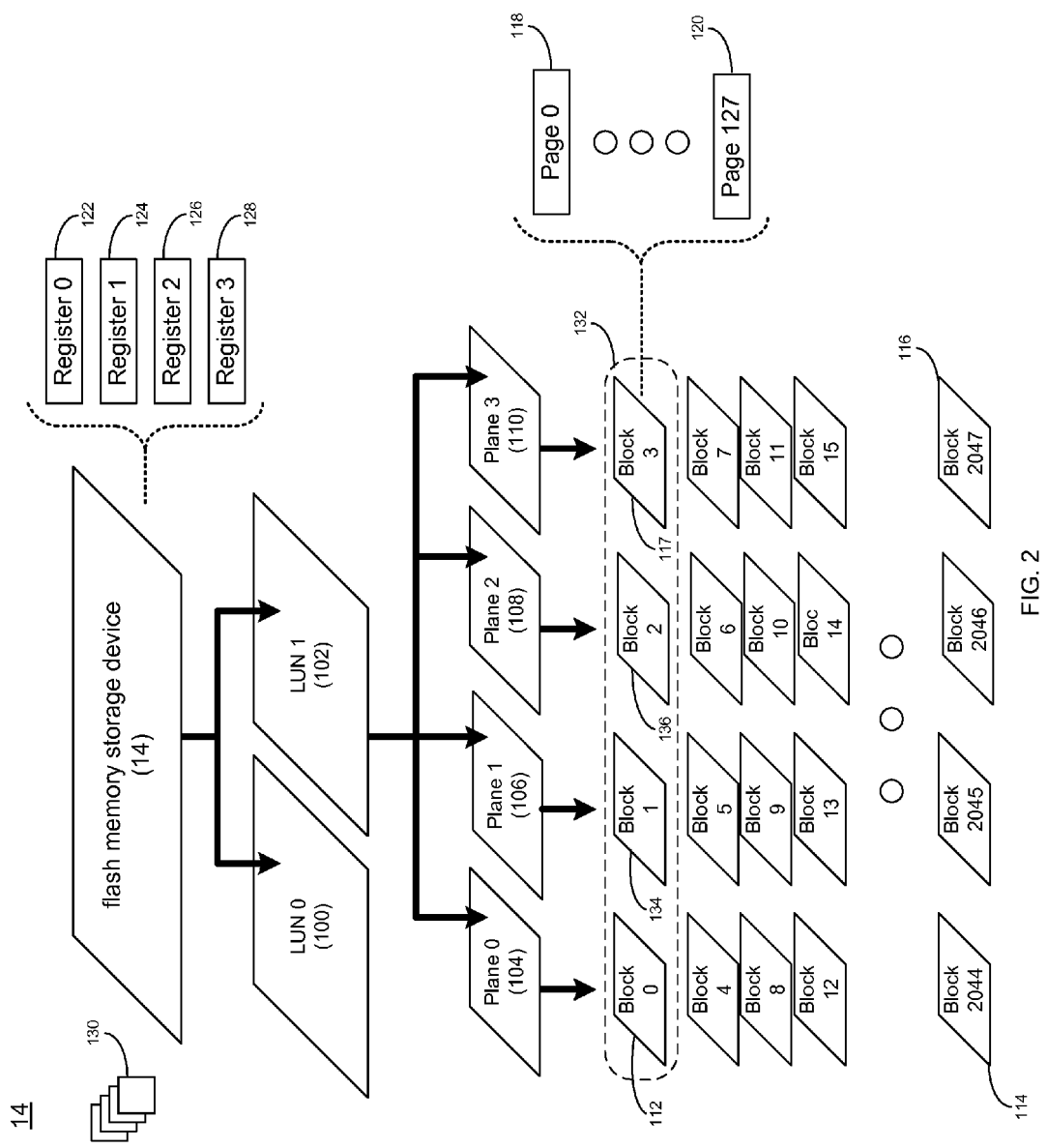
FIG. 2 is a diagrammatic view of the flash memory storage device of FIG. 1.

System Overview:

Referring to FIGS. 1 & 2, there is shown a memory system 10 that includes (in this example) memory controller 12 and flash memory storage device 14. One or more communication channels (e.g., communication channels 16, 18) may couple memory controller 12 and flash memory storage device 14. An example of such a flash memory storage device is a MT29H32G08GCAH2-12 flash memory storage device manufactured by Micron Technology, Inc.

Data (e.g., inbound data 20) may be received by memory controller 12 (from host application 22), provided to flash memory storage device 14 via e.g., communication channels 16, 18, and stored on flash memory storage device 14. Conversely, data (e.g., outbound data 24) may be retrieved from flash memory storage device 14 (via e.g., communication channels 16, 18) and provided to host application 22.

Memory system 10 may execute superblock writing process 26. Superblock writing process 26 may be a firmware process that may be executed by memory controller 12 (in its entirety), flash memory storage device 14 (in its entirety) or by a combination of memory controller 12 and flash memory storage device 14 (in a cooperative fashion).

The instruction sets and subroutines of superblock writing process 26, which may be stored on a storage device 28 coupled to/included within one or more of memory controller 12 and flash memory storage device 14, may be executed by one or more processors (not shown) and one or more memory architectures (not shown) incorporated into one or more of memory controller 12 and flash memory storage device 14. Examples of storage device 28 may include but is not limited to random access memory (RAM) and read-only memory (ROM).

Flash memory storage device 14 may be compartmentalized into a plurality of logical units. For example, flash memory storage device 14 may include two logical units (e.g., "LUN 0" 100 & "LUN 1" 102). A typical capacity for such a logical unit may be eight gigabytes of storage capacity (plus any additional surplus/reserve/administrative capacity). Accordingly, a sixteen gigabyte flash memory storage device may include two eight gigabyte logical units. By compartmentalizing flash memory storage device 14 into a plurality of logical units, overall performance of flash memory storage device 14 may be increased due to flash memory storage device 14 executing some level of parallelism.

Each logical unit (e.g., "LUN 0" 100 & "LUN 1" 102) may be compartmentalized into a plurality of data planes. For example, "LUN 1" 102 may include four data planes (e.g., "Plane 0" 104, "Plane 1" 106, "Plane 2" 108 & "Plane 3" 110). A typical capacity for such a data plane may be two gigabytes (plus any additional surplus/reserve/administrative capacity).

Each data plane (e.g., "Plane 0" 104, "Plane 1" 106, "Plane 2" 108 & "Plane 3" 110) may be compartmentalized into a plurality of data blocks. For example, "Plane 0" 104 may include five-hundred-twelve data blocks (e.g., every fourth data block starting at "Block 0" 112 and ending at "Block 2044" 114). A typical capacity for such a data block may be five-hundred-twelve kilobytes (plus any additional surplus/reserve/administrative capacity).

Further, each data block (e.g., "Block 0" 112 through "Block 2047" 116) may be compartmentalized into a plurality of data pages. For example, "Block 3" 117 may include one-hundred-twenty-eight data pages (e.g., "Page 0" 118 through "Page 127" 120). A typical capacity for such a data page may be four kilobytes (plus any additional surplus/reserve/administrative capacity).

Figure 3:
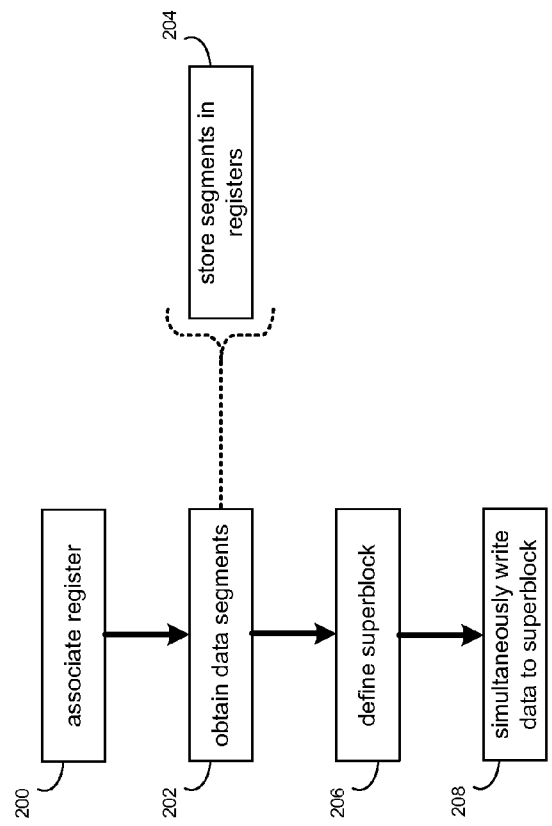
FIG. 3 is a flowchart of the superblock writing process of FIG. 1.

Referring also to FIG. 3, during operation of superblock writing process 26, superblock writing process 26 may associate 200 a register (included within flash-memory storage device 14) with each of the data planes included within flash-memory storage device 14. For example, four data registers (e.g., data registers 122, 124, 126, 128) may be associated 200 with four data planes (e.g., "Plane 0" 104, "Plane 1" 106, "Plane 2" 108 & "Plane 3" 110, respectively) included within flash-memory storage device 14. A typical capacity for such a register is four kilobytes (i.e., the capacity of a data page).

Data registers 122, 124, 126, 128 may each function as an inbound (or outbound if alternatively configured) data register for their respective data planes (e.g., "Plane 0" 104, "Plane 1" 106, "Plane 2" 108 & "Plane 3" 110, respectively). Accordingly, superblock writing process 26 may obtain 202 four data segments 130 (i.e., four four-kilobyte portions of inbound data 20) for storage within the data planes (e.g., "Plane 0" 104, "Plane 1" 106, "Plane 2" 108 & "Plane 3" 110) included within flash-memory storage device 14 and temporarily store 204 these four data segments 130 within data registers 122, 124, 126, 128 prior to four data segments 130 being stored within "Plane 0" 104, "Plane 1" 106, "Plane 2" 108 & "Plane 3" 110, respectively. Accordingly, by temporarily storing 204 the four data segments 130, data registers 122, 124, 126, 128 may buffer inbound data 20 received from memory controller 12 prior to inbound data 20 being stored on "Plane 0" 104, "Plane 1" 106, "Plane 2" 108 & "Plane 3" 110, respectively.

Superblock writing process 26 may define 206 a superblock (e.g., superblock 132), wherein any superblock defined 206 includes a data block from each of the data planes (e.g., "Plane 0" 104, "Plane 1" 106, "Plane 2" 108 & "Plane 3" 110) included within flash-memory storage device 14. For example, superblock 132 is shown to include "Block 0" 112 which is included within "Plane 0" 104; "Block 1" 134 which is included within "Plane 1" 106; "Block 2" 136 which is included within "Plane 2" 108; and "Block 3" 117 which is included within "Plane 3".

Superblock writing process 26 may be configured to simultaneously write 208 data (e.g., four data segments 130) that is currently being temporarily stored 204 within data registers 122, 124, 126, 128 to each data block included within superblock 132. Accordingly, instead of superblock writing process 26 writing to a single data block at a time, by combining (in this example) four data blocks ("Block 0" 112, "Block 1" 134, "Block 2", and "Block 3") into superblock 132 and simultaneously writing 208 data to each data block included within superblock 132, the writing efficiency of flash-memory storage device 14 may be enhanced.

Specifically and in this example, superblock writing process 26 may simultaneously write 208: the portion of four data segments 130 stored 204 within register 122 to "Plane 0" 104; the portion of four data segments 130 stored 204 within register 124 to "Plane 1" 106; the portion of four data segments 130 stored 204 within register 126 to "Plane 2" 108; and the portion of four data segments 130 stored 204 within register 128 to "Plane 3" 110.

As discussed above, a typical capacity for data registers 122, 124, 126, 128 is four kilobytes (i.e., the capacity of a data page). Accordingly, when simultaneously writing 208 data (e.g., four data segments 130) that is currently being temporarily stored 204 within data registers 122, 124, 126, 128 to each data block included within superblock 132, the data may be written one data page at a time. For example, superblock writing process 26 may obtain the four data segments 130 and store 204 the respective data segments within the respective data registers. Once obtained 202, superblock writing process 26 may simultaneously write 208 these "data page size" data segments to data pages (e.g., "Page 0" 118) included within a data block (e.g., "Block 3" 117), which is included within the superblock (e.g., superblock 132) being simultaneously written to 208. Once completed, superblock writing process 26 may obtain four additional data segments (not shown) and may store 204 the respective additional data segments within data registers 122, 124, 126, 128. Once fully obtained 202, superblock writing process 26 may simultaneously write 208 these additional "data page size" data segments to data pages included within a data block, which is included within the superblock being written to.

While the system is described above as having a defined quantity of logical units, a defined quantity of data planes, a defined quantity of data blocks, and a defined quantity of data pages, this is for illustrative purpose only as other configurations are possible and are considered to be within the scope of this disclosure. Specifically, the quantity of logical units, data planes, data blocks, and data pages may be increased or decreased depending upon design criteria.

While the system is described above as having logical units, data planes, data blocks, and data pages with defined storage capacities, these capacities are for illustrative purpose only as other configurations are possible and are considered to be within the scope of this disclosure. Specifically, the storage capacities of the logical units, data planes, data blocks, and data pages may be increased or decreased depending upon design criteria.

A number of implementations have been described. Nevertheless, it will be understood that various modifications may be made. Accordingly, other implementations are within the scope of the following claims.

What is claimed is:

1. A computer-implemented method comprising:
   obtaining N data segments for storage within N data planes included within a flash-memory storage device, wherein each of the N data planes includes a plurality of data blocks;
   defining a superblock, wherein the superblock includes a data block from each of the N data planes included within the flash-memory storage device;
   simultaneously writing data to each data block included within the superblock; and
   associating a register included within the flash-memory storage device with each of the N data planes, thus defining N associated registers.

2. The computer-implemented method of claim 1 wherein simultaneously writing data to each data block included within the superblock includes:
   simultaneously writing at least a portion of each of the N data segments to each corresponding data block included within the superblock, resulting in each data block included within the superblock being at least partially populated with data obtained from the corresponding data segment.

3. The computer-implemented method of claim 2 wherein simultaneously writing data to each data block included within the superblock includes:
   simultaneously writing a data page of each of the N data segments to each corresponding data block within the superblock.

4. The computer-implemented method of claim 3 wherein simultaneously writing a data page of each of the N data segments to each corresponding data block included within the superblock includes simultaneously writing:
   a data page of a first data segment to a first data block included within the superblock;
   a data page of a second data segment to a second data block included within the superblock;
   a data page of a third data segment to a third data block included within the superblock; and
   a data page of a fourth data segment to a fourth data block included within the superblock.

5. The computer-implemented method of claim 1 wherein obtaining N data segments for storage within N data planes included within a flash-memory storage device includes:
   temporarily storing each of the N data segments within an associated register chosen from the N associated registers.

6. The computer-implemented method of claim 1 wherein:
   N is equal to four; and
   the plurality of data blocks includes five-hundred-twelve data blocks.

7. A computer program product residing on a non-transitory computer readable medium having a plurality of instructions stored thereon that, when executed by a processor, cause the processor to perform operations comprising:

obtaining N data segments for storage within N data planes included within a flash-memory storage device, wherein each of the N data planes includes a plurality of data blocks;

defining a superblock, wherein the superblock includes a data block from each of the N data planes included within the flash-memory storage device;

simultaneously writing data to each data block included within the superblock; and associating a register included within the flash-memory storage device with each of the N data planes, thus defining N associated registers.

8. The computer program product of claim 7 wherein the instructions for simultaneously writing data to each data block included within the superblock include instructions for:

simultaneously writing at least a portion of each of the N data segments to each corresponding data block included within the superblock, resulting in each data block included within the superblock being at least partially populated with data obtained from the corresponding data segment.

9. The computer program product of claim 8 wherein the instructions for simultaneously writing data to each data block included within the superblock include instructions for:

simultaneously writing a data page of each of the N data segments to each corresponding data block within the superblock.

10. The computer program product of claim 9 wherein the instructions for simultaneously writing a data page of each of the N data segments to each corresponding data block included within the superblock include instructions for simultaneously writing:

a data page of a first data segment to a first data block included within the superblock;

a data page of a second data segment to a second data block included within the superblock;

a data page of a third data segment to a third data block included within the superblock; and a data page of a fourth data segment to a fourth data block included within the superblock.

11. The computer program product of claim 7 wherein the instructions for obtaining N data segments for storage within N data planes included within a flash-memory storage device include instructions for:

temporarily storing each of the N data segments within an associated register chosen from the N associated registers.

12. The computer program product of claim 7 wherein:
N is equal to four; and
the plurality of data blocks includes five-hundred-twelve data blocks.

13. A computing system comprising:
at least one processor;
at least one memory architecture coupled with the at least one processor;

a first software module executed on the at least one processor and the at least one memory architecture, wherein the first software module is configured to obtain N data segments for storage within N data planes included within a flash-memory storage device, wherein each of the N data planes includes a plurality of data blocks;

a second software module executed on the at least one processor and the at least one memory architecture, wherein the second software module is configured to define a superblock, wherein the superblock includes a data block from each of the N data planes included within the flash-memory storage device;

a third software module executed on the at least one processor and the at least one memory architecture, wherein the third software module is configured to simultaneously write data to each data block included within the superblock; and a fourth software module executed on the at least one processor and the at least one memory architecture, wherein the fourth software module is configured to associate a register included within the flash-memory storage device with each of the N data planes, thus defining N associated registers.

14. The computing system of claim 13 wherein the third software module is further configured for:

simultaneously writing at least a portion of each of the N data segments to each corresponding data block included within the superblock, resulting in each data block included within the superblock being at least partially populated with data obtained from the corresponding data segment.

15. The computing system of claim 14 wherein the third software module is further configured for:

simultaneously writing a data page of each of the N data segments to each corresponding data block included within the superblock.

16. The computing system of claim 15 wherein the third software module is further configured for simultaneously writing:

a data page of a first data segment to a first data block included within the superblock;

a data page of a second data segment to a second data block included within the superblock;

a data page of a third data segment to a third data block included within the superblock; and a data page of a fourth data segment to a fourth data block included within the superblock.

17. The computing system of claim 13 wherein the first software module is further configured for:

temporarily storing each of the N data segments within an associated register chosen from the N associated registers.

18. The computing system of claim 13 wherein:
N is equal to four; and
the plurality of data blocks includes five-hundred-twelve data blocks.

* * * * *